US 9,481,446 B2

(12) United States Patent
Lassen et al.

(10) Patent No.: US 9,481,446 B2
(45) Date of Patent: Nov. 1, 2016

(54) SYSTEM FOR LATCHING AND LOCKING A FOLDABLE AIRFOIL

(71) Applicant: The Boeing Company, Chicago, IL (US)

(72) Inventors: Matthew A. Lassen, Seattle, WA (US); Nicholas A. Ostrom, Needham, MA (US); Jared D. Weaver, Anthon, IA (US); Daniel R. Whitt, Naperville, IL (US)

(73) Assignee: THE BOEING COMPANY, Chicago, IL (US)

(*) Notice: Subject to any disclaimer, the term of this patent is extended or adjusted under 35 U.S.C. 154(b) by 36 days.

(21) Appl. No.: 14/262,608

(22) Filed: Apr. 25, 2014

(65) Prior Publication Data

US 2014/0319268 A1    Oct. 30, 2014

Related U.S. Application Data

(63) Continuation of application No. 13/664,416, filed on Oct. 30, 2012.

(51) Int. Cl.
    B64C 3/56    (2006.01)
(52) U.S. Cl.
    CPC ............. B64C 3/56 (2013.01); *Y02T 50/145* (2013.01)
(58) Field of Classification Search
    CPC .................................................. B64C 3/56
    USPC ............................................................ 244/49
    See application file for complete search history.

(56) References Cited

U.S. PATENT DOCUMENTS

| 2,289,224 A | 7/1942 | Anderson et al. |
| 2,290,850 A | 7/1942 | Umschweif |
| 2,418,301 A | 4/1947 | Charles |
| 2,719,682 A * | 10/1955 | Handel ...................... B64C 3/56 244/49 |
| 2,881,994 A * | 4/1959 | Michael ..................... B64C 3/26 244/124 |
| 3,081,053 A * | 3/1963 | Jarrell ....................... B64C 3/56 244/131 |
| 4,247,062 A | 1/1981 | Brueckner |
| 4,824,053 A | 4/1989 | Sarh |
| 5,072,894 A | 12/1991 | Cichy |
| 5,201,479 A | 4/1993 | Renzelmann |
| 5,310,138 A | 5/1994 | Fitzgibbon |
| 5,381,986 A | 1/1995 | Smith et al. |

(Continued)

FOREIGN PATENT DOCUMENTS

| EP | 1531126 A1 | 5/2005 |
| EP | 0988225 | 10/2006 |

(Continued)

OTHER PUBLICATIONS

European Patent Office, "Extended European Search Report," issued in connection with Application No. 15164809.4, Sep. 9, 2015, 7 pages.

(Continued)

*Primary Examiner* — Marc Burgess
(74) *Attorney, Agent, or Firm* — Hanley, Flight and Zimmerman, LLC

(57) ABSTRACT

An aircraft comprises a foldable airfoil. The airfoil includes inboard and outboard sections that are hinged together about a hinge line. The airfoil further includes a first latching mechanism on an inboard side of the hinge line, and a second latching mechanism on an outboard side of the hinge line for latching the outboard section to the inboard section.

26 Claims, 5 Drawing Sheets

(56) References Cited

U.S. PATENT DOCUMENTS

| | | | |
|---|---|---|---|
| 5,558,299 A | 9/1996 | Veile | |
| 6,032,418 A * | 3/2000 | Larson | B64C 3/56 |
| | | | 74/483 R |
| 6,082,665 A | 7/2000 | Spitzer | |
| 6,089,502 A | 7/2000 | Herrick et al. | |
| 6,260,799 B1 * | 7/2001 | Russ | B64C 3/56 |
| | | | 244/49 |
| 6,834,835 B1 | 12/2004 | Knowles et al. | |
| 7,275,722 B2 | 10/2007 | Irving et al. | |
| 7,322,545 B2 * | 1/2008 | Sheahan, Jr. | B64C 3/56 |
| | | | 244/49 |
| 7,744,038 B2 | 6/2010 | Sankrithi et al. | |
| 8,342,447 B2 | 1/2013 | Etling | |
| 8,708,286 B2 | 4/2014 | Sakurai et al. | |
| 8,733,692 B2 * | 5/2014 | Kordel | B64C 3/56 |
| | | | 244/49 |
| 9,211,946 B2 | 12/2015 | Good et al. | |
| 9,290,260 B2 | 3/2016 | Lassen et al. | |
| 9,296,469 B2 | 3/2016 | Santini et al. | |
| 2004/0000619 A1 | 1/2004 | Barriety | |
| 2009/0302159 A1 | 12/2009 | Pajard | |
| 2010/0084516 A1 | 4/2010 | Eberhardt | |
| 2011/0180657 A1 | 7/2011 | Gionta et al. | |
| 2013/0099060 A1 | 4/2013 | Dees et al. | |
| 2013/0292508 A1 | 11/2013 | Fox | |
| 2014/0117150 A1 * | 5/2014 | Good | B64C 3/56 |
| | | | 244/49 |
| 2014/0117151 A1 | 5/2014 | Fox et al. | |
| 2015/0210377 A1 | 7/2015 | Good et al. | |
| 2015/0298793 A1 | 10/2015 | Fox et al. | |
| 2016/0083074 A1 | 3/2016 | Santini et al. | |

FOREIGN PATENT DOCUMENTS

| | | |
|---|---|---|
| EP | 2650212 A1 | 10/2013 |
| GB | 481050 | 3/1938 |
| GB | 773739 | 5/1957 |
| GB | 2454588 | 5/2009 |
| WO | 2011051699 | 5/2011 |
| WO | 2011070532 | 6/2011 |

OTHER PUBLICATIONS

United States Patent and Trademark Office, "Non-Final Office Action," issued in connection with U.S. Appl. No. 13/664,416, May 26, 2015, 27 pages.

United States Patent and Trademark Office, "Requirement for Restriction/Election," issued in connection with U.S. Appl. No. 13/664,416, Feb. 12, 2015, 6 pages.

Folding wing, http://en.wikipedia.org/wiki/Folding_wing.

Canadian Patent Office, "Office action" issued in connection with Canadian patent application No. 2,824,108, Jun. 17, 2016, 4 pages.

* cited by examiner

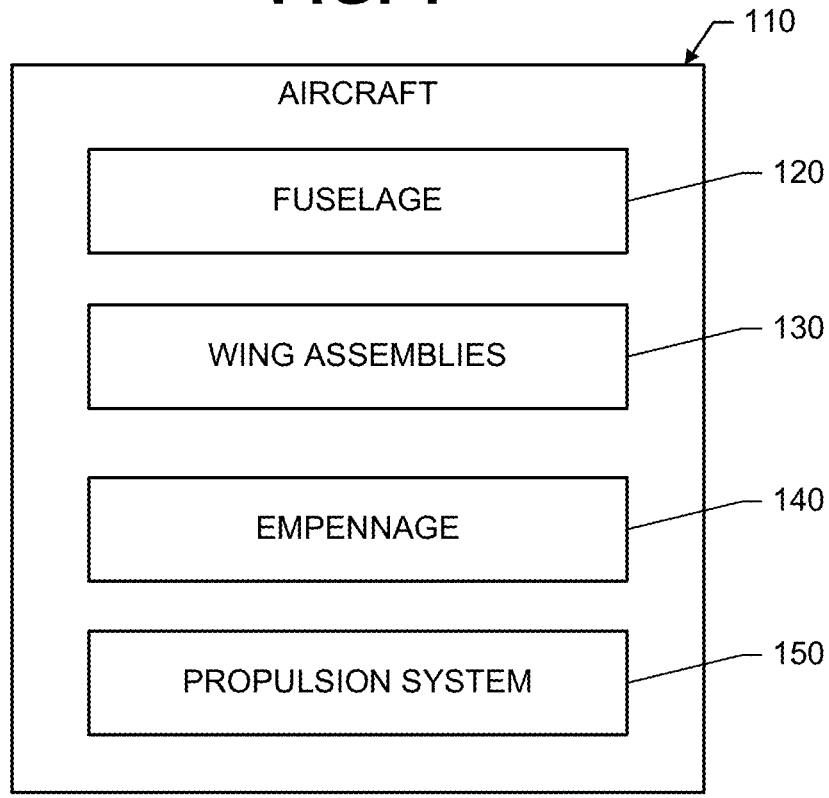
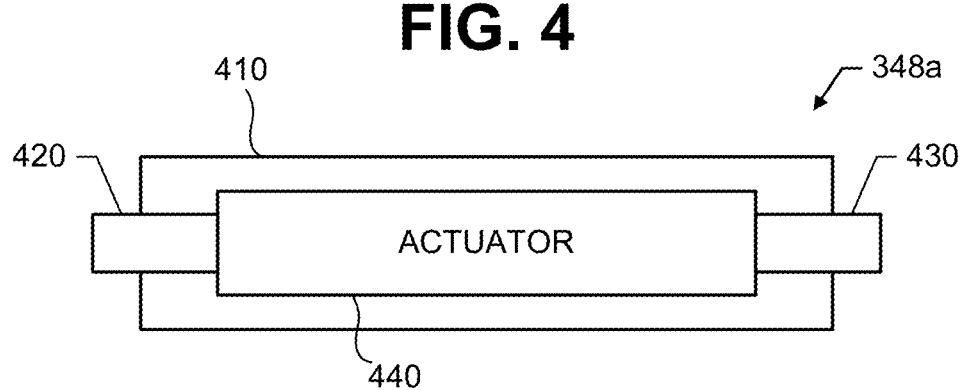

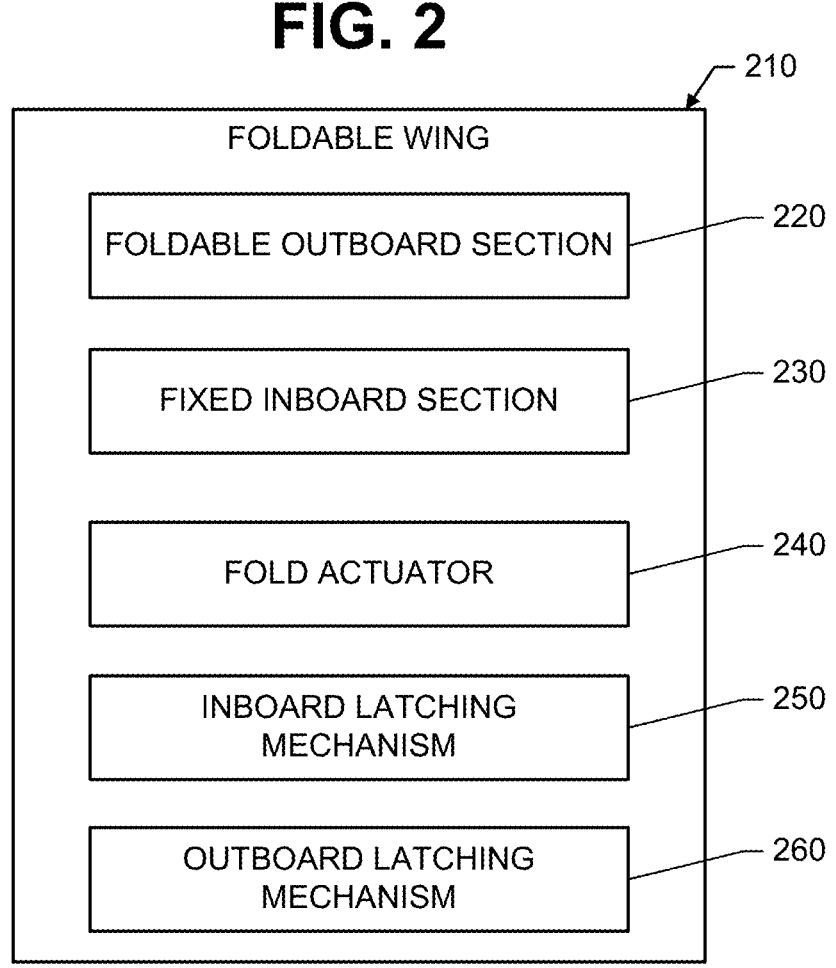

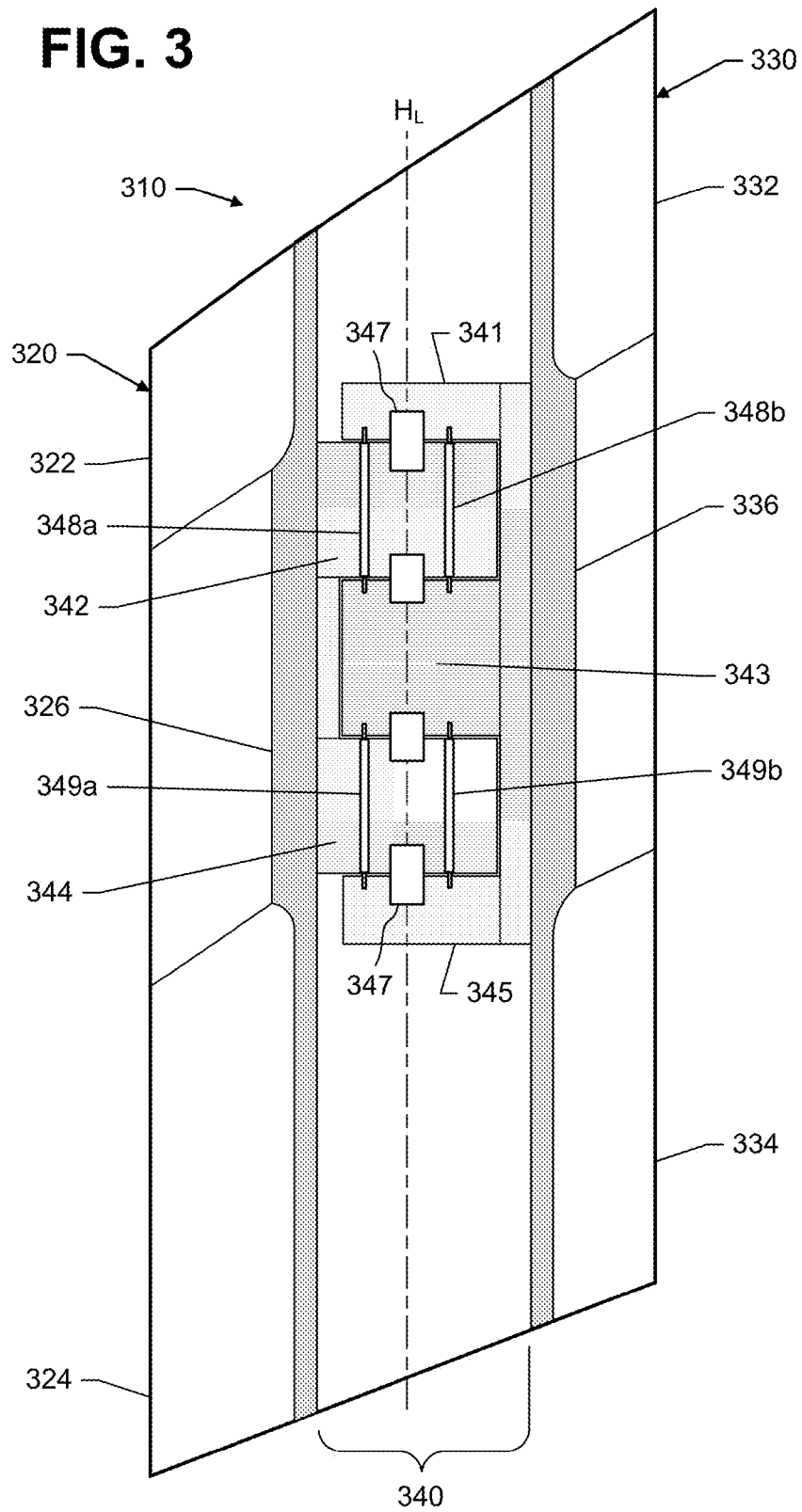

SYSTEM FOR LATCHING AND LOCKING A FOLDABLE AIRFOIL

This is a continuation-in-part of copending U.S. Ser. No. 13/664,416 filed 30 Oct. 2012.

BACKGROUND

Long span wings are desirable for commercial aircraft as they are more aerodynamically efficient than shorter wings. Greater aerodynamic efficiency reduces fuel consumption, which reduces operating costs.

Existing airport designs place limits on aircraft wingspan. Airport designs are based on International Civil Aviation Organization (ICAO) Codes A through F, which establish dimensional limits on wingspan, landing gear width, length, etc. For instance, an ICAO Code E airport limits wingspan to less than 65 meters.

A folding wing design may be used to reduce the span of these wings to fit within the limitations of an existing airport's infrastructure (e.g., runways, taxiways, and gate areas). Folding wings may be folded to fit within parking areas and taxiways, and they may be deployed prior to takeoff to increase wing span.

A folding wing design may include a foldable outboard section that is hinged to a fixed inboard section for movement between a stowed position and a deployed position. After being moved to the deployed position, the foldable section is fixed to the fixed section. Wing fold joints may use hinges and latch pins.

In commercial aircraft, high reaction loads may be overcome by increasing the size of the hinges and latch pins. However, these size increases are undesirable because they increase aircraft weight. The increase in weight negates the advantages offered by the long span wings.

SUMMARY

According to an embodiment herein, an aircraft comprises a foldable airfoil. The airfoil includes inboard and outboard sections that are hinged together about a hinge line. The airfoil further includes a first latching mechanism on an inboard side of the hinge line, and a second latching mechanism on an outboard side of the hinge line for latching the outboard section to the inboard section.

According to another embodiment herein, a foldable wing comprises a fixed section, a foldable section, and a hinge assembly for hinging the foldable section to the fixed section. The hinge assembly includes a single torque box that is hinged to shear walls, and first and second latch pin actuators on opposite sides of the hinge line for latching the torque box to the shear walls when the foldable section is deployed.

According to another embodiment herein, a hinge assembly for a foldable airfoil comprises a single torque box, and shear walls on opposite sides of the torque box. The torque box is hinged to the shear walls about a hinge line. The hinge assembly further comprises first and second latch pin actuators on opposite sides of the hinge line for latching the torque box to the shear walls.

According to another embodiment herein, a method of enhancing aerodynamic performance of a foldable wing comprises turning a torque box about a hinge line to rotate a foldable section to a deployed position, and latching the torque box from inboard and outboard sides of the hinge line.

These features and functions may be achieved independently in various embodiments or may be combined in other embodiments. Further details of the embodiments can be seen with reference to the following description and drawings.

BRIEF DESCRIPTION OF THE DRAWINGS

FIG. 1 is an illustration of an aircraft.
FIG. 2 is an illustration of a foldable wing for an aircraft.
FIG. 3 is an illustration of a foldable wing including multiple torque boxes.
FIG. 4 is an illustration of a double-ended latch pin actuator.

DETAILED DESCRIPTION

Figure 5:
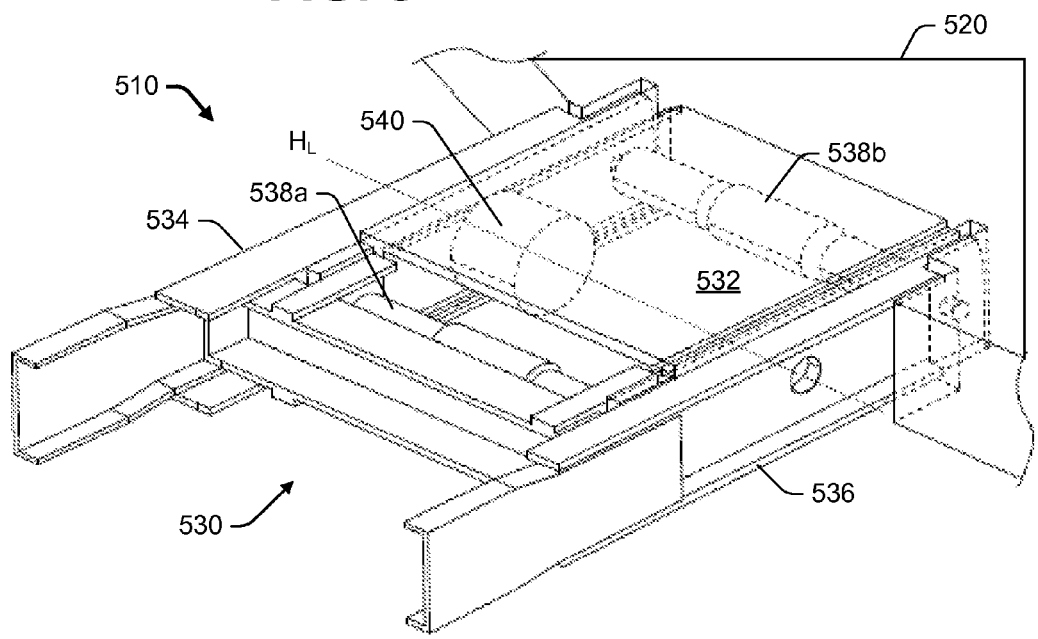
FIG. 5 is an illustration of a foldable wing including a single torque box and multiple latch pin actuators for the torque box.

Reference is made to FIG. 1, which illustrates an aircraft 110 including a fuselage 120, wing assemblies 130, and empennage 140. One or more propulsion units 150 are coupled to the fuselage 120, wing assemblies 130 or other portions of the aircraft 110. At least one of the wing assemblies 130 and the empennage 140 includes a foldable airfoil. The foldable airfoil includes a fixed section and a foldable section that is hinged to the fixed section. As a first example of a foldable airfoil, each wing assembly 130 includes a foldable wing. The foldable wings of the wing assemblies 130 may be stowed to fit the aircraft 110 within runways, taxiways and gate areas. Stowing the foldable wings may enable the aircraft 110 to comply with airport codes, such as ICAO and/or FAA codes. The foldable wings may be deployed prior to takeoff to lengthen the wingspan. The lengthened wingspan enables higher aerodynamic efficiency without incurring penalties from increased weight or drag.

As a second example of a foldable airfoil, the empennage 140 includes a foldable vertical stabilizer. The foldable vertical stabilizer may be stowed to fit within a hangar.

Reference is made to FIG. 2, which illustrates a foldable wing 210 including a foldable outboard section 220 and a fixed inboard section 230. The foldable outboard section 220 is hinged to the fixed inboard section 230 about a hinge line. A fold actuator 240 causes the foldable outboard section 220 to fold about the hinge line between a stowed position and a deployed position.

The fixed inboard section 230, which may be a main wing or an inboard section thereof, includes moveable flight control surfaces (e.g., ailerons, slats, flaps). The foldable outboard section 220 may or may not include moveable flight control surfaces. In some embodiments, the foldable outboard section 220 may be a wing tip. In other embodiments, the foldable outboard section 220 may include an outboard section of the main wing.

An inboard latching mechanism 250 is located on an inboard side of the hinge line. An outboard latching mechanism 260 is located on an outboard side of the hinge line. The latching mechanisms 250 and 260 latch the foldable outboard section 220 to the fixed inboard section 230 when the outboard section 220 is in a deployed position. Each latching mechanism 250 and 260 may include one or more latch pin actuators.

Placing the latching mechanisms 250 and 260 on opposite sides of the hinge line can create an ideal load path with no joints to maneuver. It saves weight in the structure that transfers flight loads to the fixed inboard section 230. It also results in a better load sharing for latching mechanisms 250 and 260 that are equi-distant from the hinge line (the latching mechanisms 250 and 260 will experience the same amount of load).

In some embodiments, the foldable outboard section 220 may be hinged to the fixed inboard section 230 via one or more torque boxes. In general, a torque box is a closed structure that can carry both bending and torsional loads. A torque box may have a box-like structure, but is not so limited. For instance, a torque box may have the shape of a torque tube. Torque boxes are described in greater detail in assignee's U.S. Ser. No. 13/664,371 filed 30 Oct. 2012, which is incorporated herein by reference.

Reference is made to FIG. 3, which illustrates a foldable wing 310 including a foldable section 320 that is hinged to a fixed section 330 via a hinge assembly 340. The foldable section 320 includes front and rear spars 322 and 324 extending in a spanwise direction, and a closeout rib 326 extending in a chordwise direction. The fixed section 330 includes front and rear spars 332 and 334 extending in a spanwise direction, and a closeout rib 336 extending in a chordwise direction.

The hinge assembly 340 includes a plurality of interleaved torque boxes 341-345 that are hinged together. First, third, and fifth torque boxes 341, 343 and 345 extend in a spanwise direction from the closeout rib 336 of the fixed section 330. Second and fourth torque boxes 342 and 344 extend in a spanwise direction from the closeout rib 326 of the foldable section 320.

The second torque box 342 is hinged between the first and third torque boxes 341 and 343 by hinge pins 347. The fourth torque box 344 is hinged between the third and fifth torque boxes 343 and 345 by hinge pins 347. A hinge line $H_L$ extends through the hinge pins 347 in a chordwise direction through a central location of the foldable section 320. Although a chordwise hinge line $H_L$ is shown in FIG. 3, a skewed hinge axis may be used in some embodiments.

The foldable section 320 is folded about the hinge axis $H_L$ by rotating the second and fourth torque boxes 342 and 344 about the hinge axis $H_L$. The foldable section 320 may be folded upward or downward into a stowed position. The foldable section 320 may be folded to a deployed position that is in-plane with the fixed section 330.

The hinge line $H_L$ may be aligned with the closeout ribs 326 and 336, and perpendicular or skewed to the front spar 332 of the fixed section 330. This chordwise design may keep drive systems and actuators in the same plane for easier power transfer and more compact construction. It reduces or eliminates the need for offset gearboxes, universal joints and torque tubes, thus reducing weight and increasing reliability of the hinge assembly 340.

Rotary actuators (not shown) may be used to rotate the second and fourth torque boxes 342 and 344 about the hinge axis $H_L$. The hinge pins 347 reduce the motion to rotation only. A rotary actuator may include, without limitation, a conventional planetary gearbox, or a rotary vane hydraulic actuator, or a hydraulic actuator that has a linear piston pushing against a helical screw.

The hinge assembly 340 further includes an outboard latch mechanism including first and second double-ended retractable latch pin actuators 348a and 349a on an outboard side of the hinge line $H_L$. The hinge assembly 340 further includes an inboard locking mechanism including third and fourth double-ended retractable latch pin actuators 348b and 349b on the inboard side of the hinge line $H_L$.

The latch pin actuators 348a and 348b are located inside the second torque box 342, and extend in a chordwise direction between the sides of the second torque box 342. Similarly, the latch pin actuators 349a and 349b are located inside the fourth torque box 344, and extend in a chordwise direction between the sides of the second torque box 344.

Reference is made to FIG. 4, which illustrates a double-ended latch pin actuator 348a (the other latch pin actuators 348b, 349a and 349b may have the same construction). The latch pin actuator 348a may include a housing 410, latch pins 420 and 430 at opposite ends of the housing 410, and an actuator 440 for moving the latch pins 420 and 430 between a fully retracted position and a fully extended position. The latch pins 420 and 430 are moved to the fully extended position to latch the deployed foldable section 320 to the fixed section 330. The latch pins 420 and 430 are fully retracted to enable the foldable section 320 to be moved between the deployed and stowed positions. Motive power (hydraulics, electricity, pneumatics) for the actuator 440 may be routed through the hinge pins 347.

The latch pin actuator 348a may further include a mechanism (not shown) for locking the latch pins 420 and 430 in the extended position. For example, the mechanism may include a mechanical lock for creating physical interference behind the latch pins 420 and 430 when the latch pins 420 and 430 have been moved to the extended position.

Returning to FIG. 3, the latch pin actuators 348a and 348b may extend from sidewall to sidewall of the second torque box 342. Similarly, the latch pin actuators 349a and 349b may extend from sidewall to sidewall of the fourth torque box 344. When the latch pins are fully extended, they engage adjacent torque boxes. For example, the latch pins of the actuators 348a and 348b extend through openings in spanwise sidewalls of the first and third torque boxes 341 and 343. Similarly, the latch pins of the actuators 349a and 349b extend through openings in spanwise sidewalls of the third and fifth torque boxes 343 and 345.

The latch pin actuators 348a, 348b, 349a and 349b may be oriented parallel to the hinge line $H_L$. As a result of their parallel orientation, the latch pins don't take their loads all along a single axis and all lock through a single straight piece of structure, creating an ideal load path with no joints to maneuver, which saves weight in the structure that transfers the loads to the fixed section 330.

The inboard and outboard latch pin actuators 348a and 348b may be equi-distant from the hinge line $H_L$. The inboard and outboard latch pin actuators 349a and 349b may be equi-distant from the hinge line $H_L$. This equi-distant arrangement enables all latch pin actuators to have the same size, which facilitates easier load sharing between pins, and part commonality (fewer spares are needed).

A hinge assembly herein is not limited to the arrangement illustrated in FIG. 3. As a first example, the latch pin actuators 348a and 349a may be located in the second and fourth torque boxes 342 and 344, and a single latch pin actuator 348b may be located in the third torque box 343. As a second example, latch pin actuators 348a and 348b are located only in the third torque box 343.

A hinge assembly herein is not limited to latch actuators with double-ended latch pins. Two separate latch pin actuators may be used instead of a double-ended pin actuator.

A hinge assembly herein is not limited to inboard and outboard latch pin actuators that are equi-distant from the hinge line HL. A non-equidistant arrangement provides freedom to have latch pin actuators of different sizes. For example, if the inboard latch pin actuators are closer to the hinge line $H_L$, they would be smaller and the outboard latch pin actuators would be larger.

Regardless, placing the redundant latch pin actuators on the inboard and outboard sides of the hinge line can result in a more compact hinge assembly, which can be used on smaller airplanes. On a smaller wing, spatial constraints may limit the use of additional torque boxes. On some wings, there may sufficient space for only a single torque box.

Reference is made to FIG. 5, which illustrates a foldable wing 510 including a foldable section 520 that is hinged to a fixed section (not shown) by a hinge assembly 530. The hinge assembly 530 includes a single torque box 532 extending spanwise from the foldable section 520. The hinge assembly 530 further includes first and second spanwise shear wall structures 534 and 536 on opposite sides of the torque box 532. The torque box 532 is hinged to the shear wall structures 534 and 536 about a hinge line $H_L$. Each shear wall structure 534 and 536 may include one or more shear walls.

A rotary actuator 540 causes the torque box 532 to rotate about the hinge line $H_L$. The rotary actuator 540 is located inside the torque box 532.

Inboard and outboard double-ended latch pin actuators 538a and 538b are also located inside the torque box 532, on opposite sides of the hinge line $H_L$. Each latch pin actuator 538a and 538b extends chordwise. When fully extended, latch pins of the actuators 538a and 538b extend through openings in the shear wall structures 534 and 536. A double shear wall provides a better structural load path than a single shear wall. The additional shear wall creates redundancy of lugs and clevises for the latch pins to go through.

Figure 6:
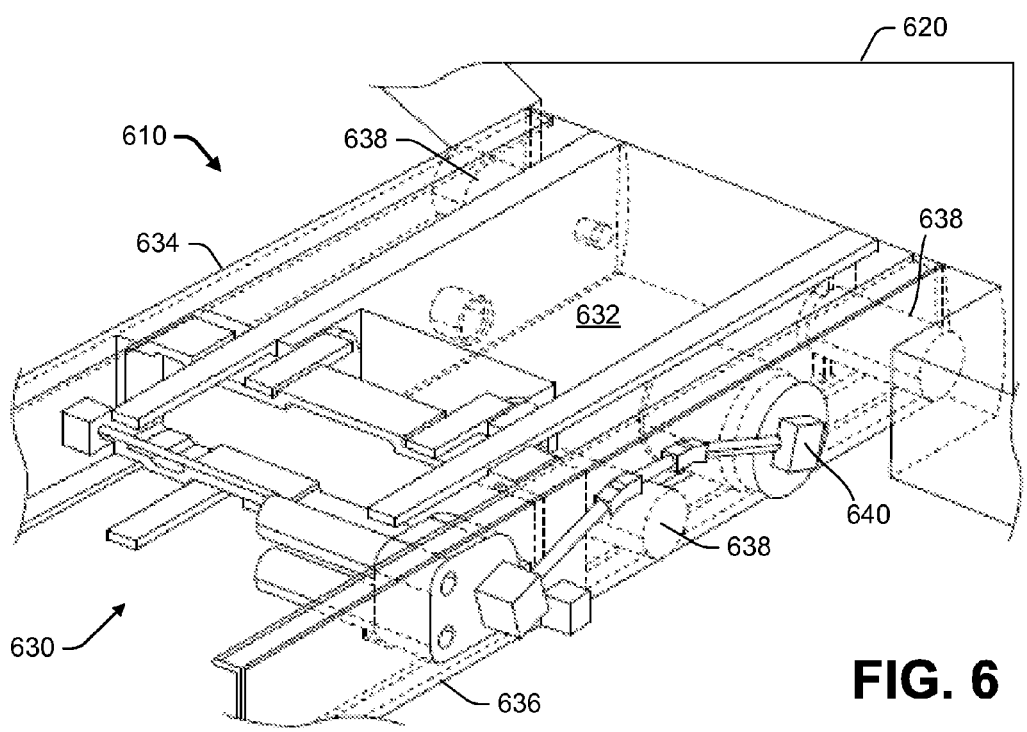
FIG. 6 is an illustration of a foldable wing including a single torque box and multiple latch pin actuators for the torque box.

Reference is made to FIG. 6, which illustrates a foldable wing 610 including a foldable section 620 that is hinged to a fixed section (not shown) by a hinge assembly 630. The hinge assembly 630 includes a single torque box 632 extending spanwise from the foldable section 620. The hinge assembly 630 further includes first and second spanwise shear wall structures 634 and 636 on opposite sides of the torque box 632. The torque box 632 is hinged to the shear wall structures 634 and 636 about a hinge line $H_L$.

A rotary actuator 640 causes the torque box 632 to rotate about the hinge line $H_L$. The rotary actuator 640 is located outside the torque box 632.

The hinge assembly 630 further includes four single-ended latch pin actuators 638. The latch pin actuators 638 are attached to the shear wall structures 634 and 636, outside the torque box 632. Each latch pin actuator 638 may be located at a corner of the torque box 632. Latch pins of the actuators 638 extend into the torque box 632 to latch the foldable section 620 to the fixed section.

The hinge assemblies 530 and 630 of FIGS. 5 and 6 enable four latch pins to be used in a single torque box 532 and 632. If one latch pin fails, the three other latch pins, as well as the hinge pins, can share and sustain the resulting increased load. Additionally, as the pins surround the hinge, they take the flight loads at all four extremes of the torque box.

In the wings 510 and 610 of FIGS. 5 and 6, the shear wall structures are not limited to shear walls. The latch pins may latch onto other structures such as cargo doors and fuel pods.

Figure 7:
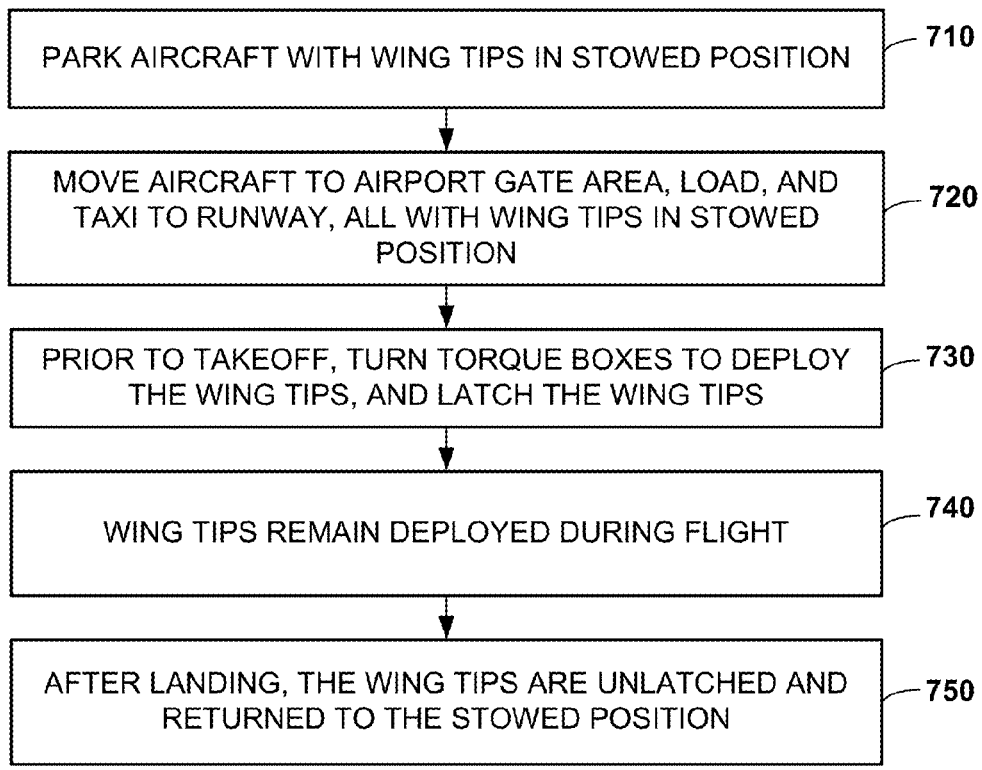
FIG. 7 is an illustration of a method of enhancing performance of a commercial aircraft that includes wing assemblies with folding wing tips.

Reference is now made to FIG. 7, which illustrates a method of enhancing performance of a commercial aircraft that includes wings with folding wing tips. The folding wing tips are hinged to inboard sections of the main wings.

At block 710, the aircraft is parked with its wing tips in a stowed position. At block 720, the aircraft is moved to a gate, loaded, and taxied to a runway. The wing tips remain in the stowed position so the aircraft can fit within taxiways en route to the runway.

At block 730, prior to takeoff, the outboard portions of the wing tips are deployed by rotating the torque boxes extending from the wing tips. The latch pins are then extended to latch the wing tips to the main wings. By deploying the folding wing tips, wingspan is extended. The extended wingspan increases lift during takeoff At block 740, the wing tips remain latched during flight. Latch pin actuators on opposite sides of the hinge line share flight loads. The use of four latch pins provides redundancy. During flight, the extended wingspan increases aerodynamic efficiency, which reduces fuel consumption.

At block 750, the aircraft lands. The wing tips are unlatched, and rotated back to their stowed position.

The invention claimed is:

1. A foldable airfoil apparatus comprising:
   inboard and outboard sections that are movable about a hinge line; and
   a hinge assembly to hinge the inboard and outboard sections, the hinge assembly defining the hinge line, the hinge assembly including:
   a torque box;
   a first latching mechanism on an inboard side of the hinge line, the first latching mechanism including a first retractable latch pin actuator positioned entirely within the torque box; and
   a second latching mechanism on an outboard side of the hinge line, the second latching mechanism including a second retractable latch pin actuator positioned entirely within the torque box, the first and second retractable latch pin actuators to actuate the first and second latching mechanisms to latch the inboard and outboard sections when the outboard section is in a deployed position.

2. The apparatus of claim 1, wherein the airfoil is a foldable wing of a wing assembly.

3. The apparatus of claim 1, wherein the torque box extends in a spanwise direction from a closeout rib of at least one of the inboard section or the outboard section.

4. The apparatus of claim 3, wherein the hinge line is aligned with the closeout rib, and perpendicular to a front spar of the inboard section.

5. The apparatus of claim 1, wherein the torque box includes first and second spanwise walls, the hinge assembly further includes fixed structures opposing the spanwise walls, and each of the first and second retractable latch pin actuators is to actuate first and second retractable latch pins that extend through openings in the fixed structures to latch the inboard and outboard sections when the outboard section is in the deployed position.

6. The apparatus of claim 1, wherein the first and second retractable latch pin actuators are oriented parallel to the hinge line.

7. The apparatus of claim 1, wherein the first and second retractable latch pin actuators are equidistant from the hinge line.

8. The apparatus of claim 1, wherein each of the first and second retractable latch pin actuators includes a housing extending between spanwise walls of the torque box, each of the first and second latch pin actuators to actuate first and second retractable latch pins at opposite ends of the housing, each of the retractable latch pins being movable between an extended position and a retracted position.

9. The apparatus of claim 1, wherein the torque box is a second torque box, the hinge assembly including first and third torque boxes interleaved with, and hinged to, the second torque box.

10. The apparatus of claim 1, wherein the torque box includes a single torque box, and the hinge assembly includes a spanwise shear wall structure on opposite sides of the torque box, the torque box to be hinged to the shear walls about the hinge line.

11. The apparatus of claim 1, wherein motive forces to actuate the first and second latching mechanisms originate within the torque box via the first and second retractable latch pin actuators.

12. The apparatus of claim 1, wherein the torque box includes an inboard edge, the inboard edge to rotate out of plane from the inboard section when the outboard section is in a folded position.

13. A foldable wing comprising:
a fixed section;
a foldable section; and
a hinge assembly to hinge the foldable section and the fixed section, the hinge assembly defining a hinge line, the hinge assembly including:
a torque box positioned between spanwise walls;
a first retractable latch pin actuator positioned on a first side of the hinge line; and
a second retractable latch pin actuator positioned on a second side of the hinge line opposite the first side, the first and second retractable latch pin actuators to actuate retractable latch pins to latch the torque box to the spanwise walls when the foldable section is in a deployed position, wherein motive forces to actuate the retractable latch pins originate within the torque box via the first and second retractable latch pin actuators.

14. The foldable wing of claim 13, wherein the first and second retractable latch pin actuators are double-ended and are located entirely within the torque box.

15. The foldable wing of claim 13, wherein the torque box includes an inboard edge, the inboard edge to rotate out of plane from the fixed section when the foldable section is in a folded position.

16. A method of enhancing aerodynamic performance of a foldable wing including a foldable section and a fixed section, the method comprising:
turning a torque box positioned between spanwise walls about a hinge line to rotate the foldable section to a deployed position; and
latching the torque box to the spanwise walls when the foldable section is in the deployed position by actuating retractable latch pins via a first retractable latch pin actuator positioned on an inboard side of the hinge line and a second retractable latch pin actuator positioned on an outboard side of the hinge line, the first and second retractable latch pin actuators being positioned entirely within the torque box.

17. The method of claim 16, wherein the torque box includes an inboard edge, the inboard edge to rotate out of plane from the fixed section when the foldable section is in a folded position.

18. The method of claim 16, wherein motive forces to actuate the retractable latch pins originate within the torque box via the first and second retractable latch pin actuators.

19. A foldable wing comprising:
a foldable section;
a fixed section; and
a hinge assembly to pivotally couple the foldable section and the fixed section, the hinge assembly defining a hinge line, the hinge assembly including:
a first torque box, a second torque box and a third torque box, the second torque box being hinged between the first torque box and the third torque box, the second torque box including an inboard edge, the inboard edge to rotate out of plane from the fixed section when the foldable section is in a folded position;
a first outboard latch mechanism including a first retractable latch pin actuator, the first retractable latch pin actuator to actuate a first retractable latch pin, the first retractable latch pin to engage a first opening formed in at least one of the first torque box or the third torque box when the first retractable latch pin is in an extended position; and
a first inboard latch mechanism including a second retractable latch pin actuator, the second retractable latch pin actuator to actuate a second retractable latch pin, the second retractable latch pin to engage a second opening formed in at least one of the first torque box or the third torque box when the second retractable latch pin is in an extended position.

20. The foldable wing of claim 19, wherein the hinge assembly further includes a fourth torque box and a fifth torque box.

21. The foldable wing of claim 20, wherein the fourth torque box is positioned between the third torque box and the fifth torque box.

22. The foldable wing of claim 21, further comprising a second outboard latch mechanism including a third retractable latch pin actuator, the third retractable latch pin actuator to actuate a third retractable latch pin, the third retractable latch pin to engage a third opening formed in at least one of the third torque box or the fifth torque box when the third retractable latch pin is in an extended position.

23. The foldable wing of claim 22, further comprising a second inboard latch mechanism including a fourth retractable latch pin actuator, the fourth retractable latch pin actuator to actuate a fourth retractable latch pin, the fourth retractable latch pin to engage a fourth opening formed in at least one of the third torque box or the fifth torque box when the fourth retractable latch pin is in an extended position.

24. The foldable wing of claim 23, wherein the third retractable latch pin actuator and the fourth retractable latch pin actuator are positioned entirely within the fourth torque box.

25. The foldable wing of claim 19, wherein the first retractable latch pin actuator and the second retractable latch pin actuator are positioned entirely within the second torque box.

26. The foldable wing of claim 19, wherein motive forces to actuate the first and second retractable latch pins originate within the torque box via the first and second retractable latch pin actuators.

* * * * *